US005743138A

United States Patent [19]
Cheng

[11] Patent Number: 5,743,138
[45] Date of Patent: Apr. 28, 1998

[54] SPIRALLY FLUTED FLOAT

[75] Inventor: Wei Hua Cheng, Singapore, Singapore

[73] Assignee: Chartered Semiconductor Manufacturing Ltd., Singapore, Singapore

[21] Appl. No.: 788,872

[22] Filed: Jan. 22, 1997

[51] Int. Cl.⁶ .................................................. G01F 23/76
[52] U.S. Cl. ........................ 73/322.5; 73/305; 73/320
[58] Field of Search ............................ 73/305, 306, 320, 73/322.5

[56] References Cited

U.S. PATENT DOCUMENTS

| | | | |
|---|---|---|---|
| 2,678,074 | 5/1954 | Admas | 73/322.5 |
| 3,370,467 | 2/1968 | Healy | 73/320 |
| 4,051,591 | 10/1977 | Thompson | 73/322.5 |
| 4,091,659 | 5/1978 | Massey, III et al. | 73/322.5 |
| 4,289,154 | 9/1981 | Quayle | 134/56 |
| 5,259,245 | 11/1993 | Liu | 73/319 |
| 5,294,917 | 3/1994 | Wilkins | 340/625 |
| 5,365,969 | 11/1994 | Edwards | 137/387 |

*Primary Examiner*—George M. Dombroske
*Assistant Examiner*—Max H. Noori
*Attorney, Agent, or Firm*—George O. Saile; Stephen B. Ackerman

[57] ABSTRACT

A float device is disclosed with an improved external surface having an outwardly concave curvature and a plurality of elongated grooves spirally formed on the concave surface. The concave surface provides improved clearance between the float device and the walls of the pipe that it is disposed in. Therefore, the float device is less subject to being lodged or stuck especially in highly viscous liquids. The spiral grooves provide additional passageway and stability by imparting rotational torque to the floating device when measuring flow rates in moving fluids in pipes. In another embodiment, the float device is annular in shape having an inner surface with a curvature and spiral grooves. Same improved effects are obtained as the float device rides up and down a column like a collar in measuring the fluid level or fluid flow rates.

29 Claims, 3 Drawing Sheets

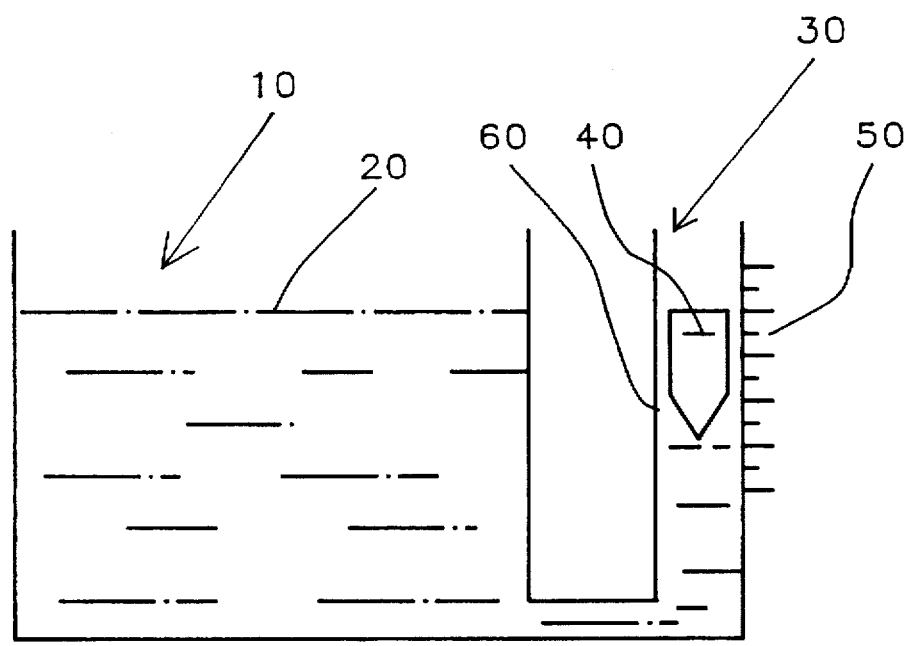
*FIG. 1a - Prior Art*
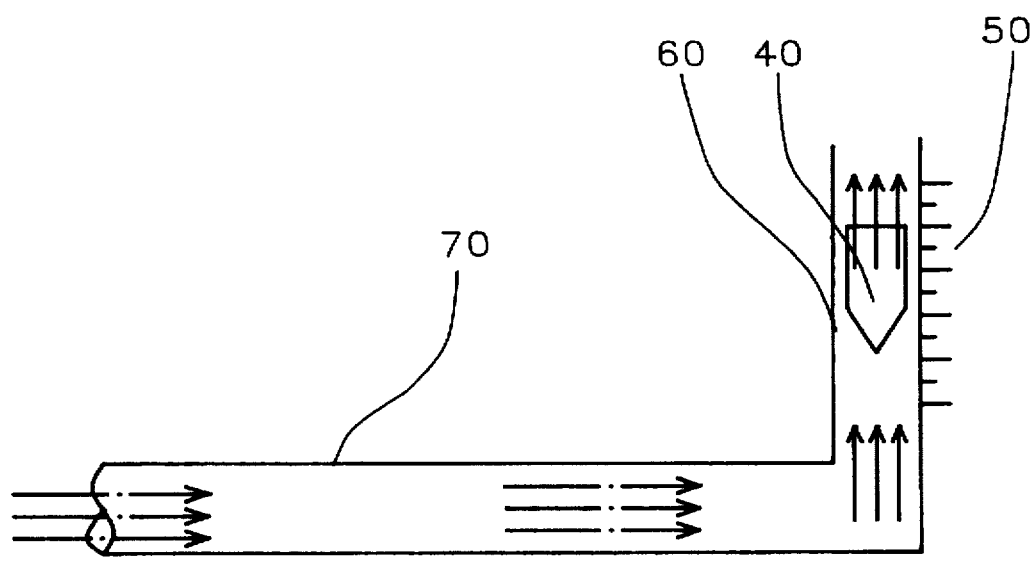
*FIG. 1b - Prior Art*

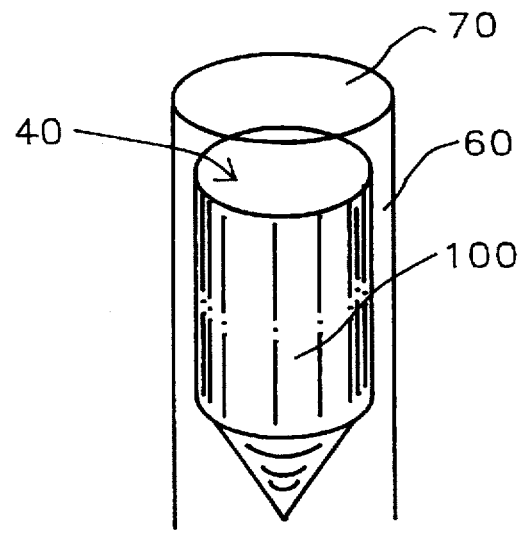
*FIG. 2 - Prior Art*
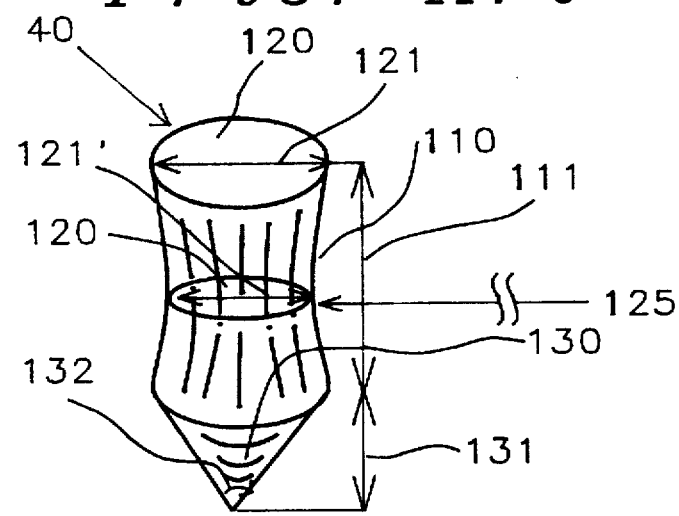
*FIG. 3a*
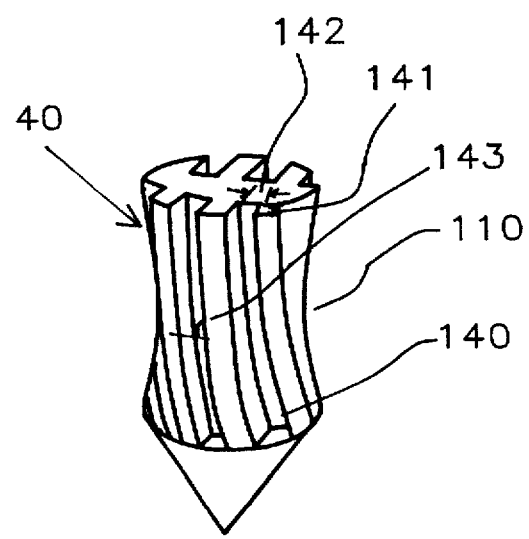
*FIG. 3b*

5,743,138

SPIRALLY FLUTED FLOAT

BACKGROUND OF THE INVENTION (1) Field of the Invention

The present invention relates generally to fluid measuring devices, and in particular, to floats used in such devices.

(2) Description of the Related Art

Fluid measuring devices usually measure the flow rate of a fluid in a conduit or the level of liquids in vessels In either type of a device, a buoyant object, called a float, is used as the indicator itself of the measured quantity or as a part of the indicator system that measures the quantity. In simple liquid level measuring systems, the float is subjected to static conditions under the influence of gravity, whereas, in flow measuring systems, the fluid is subjected to dynamic conditions and forces. Consequently, the required characteristics of floats will change according to their use.

Liquid level measuring devices are known to be used in many different applications ranging from measuring the level of gasoline in an automobile gas tank to measuring the water level in a dish washer, or to measuring the level of chemical liquids in plating tanks on a semiconductor manufacturing line. Floats are usually made of cylindrical shape although they can assume many different geometrical shapes including a prism, or a sphere. Floats may be hollow inside and used at the end of a lever in a cistern, tank, or boiler to regulate liquid level.

Though they are generally simple in construction, floats do present problems in their usage depending upon whether they are subject to static or dynamic conditions. Under static conditions where they float to indicate the level of the liquid in which they reside, they must be stable enough not to tumble over when subjected to disturbances such as jolts or vibrations. Such disturbances are encountered especially when a float used to measure flow rate of a fluid under flowing dynamic conditions. An object is said to be stable if it tends to return to its original equilibrium position when slightly disturbed. When a disturbance, that is an external force, disturbs the float, therefore, a restoring force must exist within the system of forces acting on the float to restore it to its original position. On a floating object, the system of forces is comprised of a buoyant force acting upwardly through what is known as the center of buoyancy, and the float's weigh acting downwardly through the center of gravity of the float For a totally submerged float such as in measuring flow rates, the float will be stable if the center of buoyancy is above the center of gravity. In the case with a partially submerged object, such as a float indicating the level of a body of liquid, or a ship, for that matter, another stabilizing point, called the metacenter, must be above the center of gravity. The metacenter, as is well known by those in the field to be an extension of buoyancy center; will not be further defined here as it does not directly pertain directly to the key aspects of the present invention. Suffice it to say that the stability of the float must be ascertained for proper usage in either the static mode as a level indicator, or the dynamic mode as a flow rate indicator.

The problem of stability of floats arises when the fluid properties change because of process conditions, (e.g., change in the viscosity), or simply because of the physical changes on the walls of the float. In one particular prior art float device discussed in U.S. Pat. No. 4,289,154, the vertical movement of the float inside a standpipe in a dishwasher is impeded because of the build-up of food particles and detergent scum on the float. To overcome this problem, it is proposed in the same patent a provision for utilizing the flow of liquid to clean the float. In still another application of liquid level floats in dishwashers, U.S. Pat. No. 5,365,969 discloses an improved float to prevent overfilling. In this instance, the float is provided with a skirt and a slit which would prevent the float from adhering to the bottom wall of the dishwater tub thus preventing the overfilling.

In another application where an annular float with arms slides up and down a shaft; it is disclosed in U.S. Pat. No. 5,294,917 that because of the amount of gummy material that usually develops between the inside surface of the float and the shaft, the float cannot rise due to the buoyancy alone A magnetic means is provided to overcome the impediment of the float. U.S. Pat. No. 5,259,245 also discusses a float with inner surfaces, but without arms, that moves up and down a column and thereby indicates the level of the fluid electrically through a sliding contact on the column. In other words, the latter disclosure elegantly discards conventional floats with arms which are especially difficult to install in tight places such as in the gas tank of a car.

While the prior art described above addresses some specific problems associated with the operation of floats, encountered with floats in general, and with floats having an external surface in particular. FIGS. 1a and 1b show such a float used as a liquid level indicator, and a flow rate indicator, respectively. In FIG. 1a, liquid level (20) in reservoir (10) will rise or fall as more liquid enters or leaves the reservoir. A float (40) in an adjacent pipe (30) connected to reservoir (10) as shown in FIG. 1a will also rise and fall correspondingly and indicate fluid level (20) on a calibrated scale (50), say in feet or meters, such as shown in FIG. 1a. Similarly, in a pipe (70) where there is flow of liquid, float (40) will now indicate flow rate, say in feet per minute or meters per second. However, in either one of the cases shown in FIGS. 1a or 1b, it has been the experience on semiconductor manufacturing line that with liquids such as photo-resists and $H_2SO_4$, float (40) gets destabilized or stuck in their respective pipes (50), (70) and indicate erroneous readings.

What is needed, therefore, is a float device having an improved configuration that will accommodate high viscous fluids and other destabilizing conditions. It is disclosed in this invention that the float surface (100) as shown in FIG. 2 for better viewing, can be modified to provide the stability needed for reliable operation of float (40) in pine (70) adjacent to gap (60) It is further disclosed that in addition to improvements that can be made on float devices having an external surface (100) working adjacent to an external gap (60) as shown in FIG. 2, float devices having an internal surface working adjacent to internal gap as described below can also be improved.

SUMMARY OF THE INVENTION

It is therefore an object of this invention to provide a float device having an improved external working surface to measure fluid levels.

It is another object of this invention to provide a float device having an improved external working surface to measure fluid flow rates.

It is still another object of this invention to provide an annular, collar-like float device having an improved internal working surface to measure fluid levels.

It is yet another object of this invention to provide an annular, collar-like float device having an improved internal working surface to measure fluid flow rates.

In accordance with the aforementioned objects, there is provided a float device having an improved external working surface with an outwardly concave curvature and a plurality of elongated grooves spirally formed on said concave surface.

In accordance with the aforementioned objects, there is also provided an annular, collar-like float device having an improved internal working surface with an inwardly concave curvature and a plurality of elongated grooves spirally formed on said concave surface.

BRIEF DESCRIPTION OF THE DRAWINGS

The objects and features of this invention will become apparent more readily from a reading of the detailed description in conjunction with the drawings that follow:

FIG. 1a is a schematic drawing of a prior art float device indicating the fluid level in a reservoir.

FIG. 1b is a schematic drawing of a prior art float device indicating the fluid flow rate in a pipe.

FIG. 2 is an enlarged and two-dimensional view of float device of FIG. 1b.

FIG. 3a is a three-dimensional drawing of a float device having an outwardly concave external surface according to the present invention.

FIG. 3b is a three-dimensional drawing of float device of FIG. 3a having, in addition, a plurality of elongated grooves spirally formed on said concave surface according to this invention.

DESCRIPTION OF THE PREFERRED EMBODIMENTS

Figure 4:
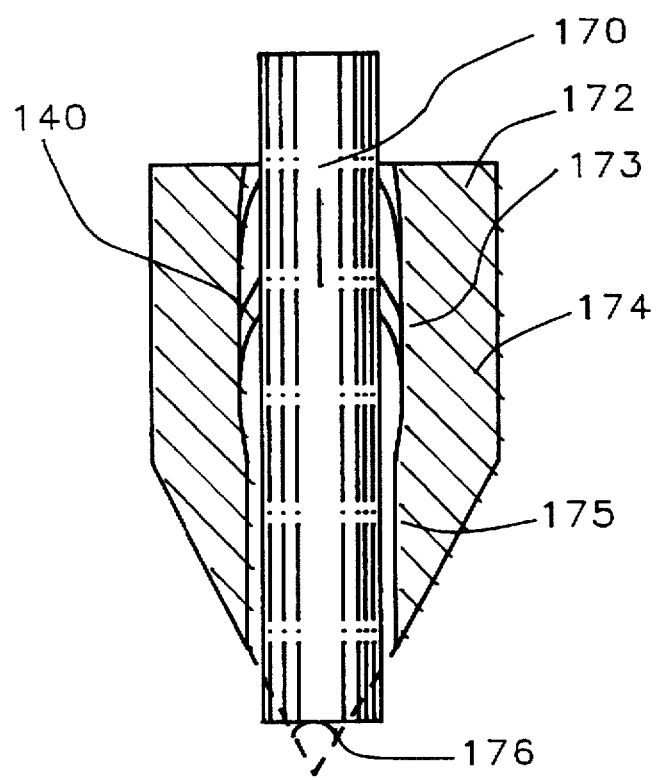
FIG. 4 is a three-dimensional drawing of float device having an internal surface with an inwardly concave curvature and a plurality of elongated grooves spirally formed on said concave surface according to this invention.

Referring now to the drawings, in particular to FIGS. 3a and 3b, there are shown three-dimensional drawings of a float device (40) having an upper end (120) and a lower end (130), and an external surface (100). Upper end (120) in both FIGS. 3a and 3b are horizontally flat while lower end (130) is conical shaped in order to provide a streamlining surface facing a flowing fluid. It is common knowledge in the field of fluid dynamics that such streamlining is used very effectively in reducing body drag forces in general, and it will not be necessary to describe it in detail here in order not to unnecessarily obscure the present invention.

In the preferred embodiment of the present invention, the length (111) of the elongated portion of float device (40) in FIG. 3a is between about 3.3 to 35 mm, the diameter (121) of upper end (120) is between about 2.3 to 25 mm, while the attitude (131) of conical portion (130) is between about 1.3 to 15 mm. The included angle (132) at the apex of cone (130) is preferred to be between about 15 to 165 degrees. External surface (100) in FIG. 3a is formed into an outwardly concave shape (110) as shown. The center of radius of curvature of concave surface (110) lies at (125) on the extended diameter (121') on plane (120') at one-half the distance (111) from the upper flat end (120) and is preferred to be between about 40 to 500 mm.

A plurality of spiral grooves (140) are next formed into external surface (110) as shown in FIG. 3b using the well-known spiral gear forming methods. Said grooves have a depth (141) of between about 0.5 to 4 mm, a width (142) of between about 0.4 to 5 mm and are spaced at a pitch between about 0.7 to 8 mm apart around the periphery of surface (110) with a spiral angle (143) between about 30 to 85 degrees.

In another embodiment of this invention, float device (40) is made to move up and down, like a collar as shown in FIG. 4, on a stationary column, or rod, (170) fixed in a reservoir, as the level of the surrounding fluid changes. A sliding electrical contact between the float device and the column (not shown) will, using prior art methods, record the level or the flow rate of the fluid depending upon the particular application. The embodiment shown according to this invention in FIG. 4 is an improvement over prior art by the incorporation of a concave surface and spiral grooves on the internal surface of the collar-like, or annular, float device.

It is preferred that the diameter of rod (170) on which the annular cylinder (172) rides like a collar in FIG. 4 is between about 2.3 to 25 mm. The inside diameter of annular cylinder (172) is between about 2.6 to 27 mm while its outside diameter is between about 5.5 to 60 mm. Annular cylinder (172) also has a lower portion (174) which is conical on the outside surface, but is straight on the inside as shown in FIG. 4. The upper portion (172) shown in FIG. 4 preferably has a vertical length, or altitude, of between about 3.5 to 37 mm, while the lower portion (174) with conical outside surface has a length between about 1.5 to 17 mm. The extended conical surface forms an included angle (176) between about 15 to 165 degrees as shown in FIG. 4. It will be appreciated that the conical section (174) can be of any desired length other than the preferred length of 15 to 17 mm. Inside surface (175) of conical section (174) is smooth while inside surface (173) of upper portion (172) has spiral grooves (180). Spiral grooves (180) have a spiral angle of between about 30 and 85 degrees, and are between about 0.3 to 4 mm deep, 0.4 to 5 mm wide and are spaced at between about 0.7 to 8 mm. Grooves (180) are superimposed on concave surface (173) of a radius of curvature of 40 to 600 mm that is formed inwardly; that is, opposite of the outwardly formed concave surface for the external surface of FIG. 3a.

Figure 5:
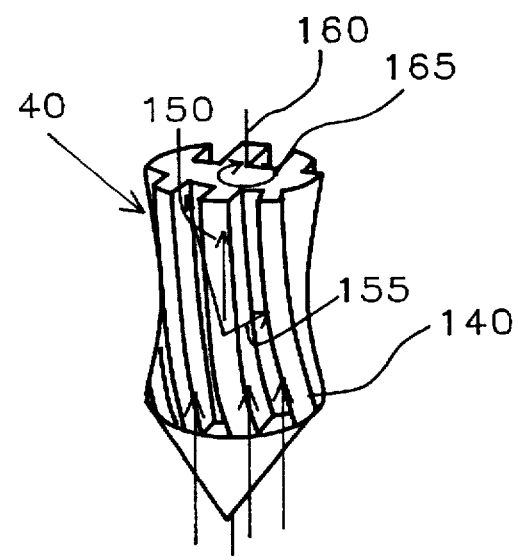
FIG. 5 is a drawing showing the forces and torque acting on float device having spiral grooves according to this invention.

The spiral grooves so formed provide inclined surfaces where the impulse of the incoming fluid in the axial direction (150) creates a component of a force in direction (155), which in turn causes a torque (165) about the axis (160) of float device (40) as shown in FIG. 5 As a result, float device (40) spins about its axis; thus gaining stability against tumbling when subjected to external forces. The forces are imparted on to the float device by particles in the fluid stream. The presence of the grooves also aid in the flow of a highly viscous fluid through the larger openings in the grooves in addition to the clearance in the gap between the float device and the walls of the pipe as described before.

In the embodiments described above, numerous details were set forth, such as specific dimensions in order to provide a thorough understanding of the present invention It will be obvious, however, to those skilled in the art that these specific details need not be employed to practice the present invention. Float devices of the same characteristics and features can be formed for different conduits of different dimensions and for different fluids of different characteristics but in keeping with the same spirit of the invention disclosed here. Thus, the grooves can be rounded, that is, fluted, to aid further in the flow of highly viscous fluids in keeping with the spirit of the invention.

That is to say, while the invention has been particularly shown and described with reference to the preferred embodiments thereof, it will be understood by those skilled in the art that various changes in form and details may be made without departing from the spirit and scope of the invention.

What is claimed is:

1. A spirally fluted float device comprising:
   an elongated cylinder having an upper end and a lower end forming said spirally fluted float;
   an external surface extending therebetween said upper end and said lower end of said elongated cylinder;
   a cone having an apex and integrally extending downwardly from said lower end of said elongated cylinder; and
   groove means formed into said external surface to provide stability when said spirally fluted float is placed floatingly in a fluid environment to measure fluid characteristics.

2. The device of claim 1, wherein said upper end of said elongated cylinder is horizontally flat.

3. The device of claim 2, wherein the diameter of said upper end is between about 2.3 to 25 mm.

4. The device of claim 1, wherein the length of said elongated cylinder is between about 3.3 to 35 mm.

5. The device of claim 1, wherein said external surface is outwardly concave.

6. The device of claim 5, wherein the radius of curvature of said outwardly concave surface is between about 40 to 500 mm.

7. The device of claim 1, wherein said cone has an altitude between about 1.3 to 15 mm.

8. The device of claim 1, wherein the included angle of said cone is between about 15 to 165 degrees.

9. The device of claim 1, wherein said groove means are spiral grooves.

10. The device of claim 9, wherein the angle of said spiral grooves is between about 30 to 85 degrees.

11. The device of claim 9, wherein said spiral grooves are spaced at a distance between about 0.7 to 8 mm.

12. The device of claim 9, wherein the depth of said spiral grooves is between about 0.3 to 4 mm.

13. The device of claim 9, wherein the width of said spiral grooves is between about 0.4 to 5 mm.

14. A spirally fluted float device comprising:
   a stationary rod;
   an elongated annular cylinder having an upper end and a lower end forming said spirally fluted float, and slidably disposed on said rod;
   an external surface extending downwardly therebetween said upper end and said lower end of said elongated annular cylinder;
   a first internal surface extending therebetween said upper end and said lower end of said elongated annular cylinder;
   an annular cone having an apex and integrally extending downwardly from said lower end;
   a second internal surface extending downwardly therebetween said lower end and apex of said cone; and
   groove means formed into said first internal surface of said elongated annular cylinder to provide stability when said spirally fluted float is placed floatingly in a fluid environment to measure fluid characteristics.

15. The device of claim 14, wherein said upper and is horizontally flat.

16. The device of claim 14, wherein the diameter of said rod is between about 2.3 to 25 mm.

17. The device of claim 14, wherein inside diameter of said elongated annular cylinder is between about 2.6 to 27 mm.

18. The device of claim 14, wherein outside diameter of said elongated annular cylinder is between about 5.5 to 60 mm.

19. The device of claim 14, wherein the length of said elongated annular cylinder is between about 3.5 to 37 mm.

20. The device of claim 14, wherein said external surface is uniformly flat.

21. The device of claim 14, wherein said first internal surface is inwardly concave.

22. The device of claim 21, wherein the radius of curvature of said inwardly concave surface is between about 40 to 600 mm.

23. The device of claim 14, wherein said annular cone has an attitude between about 3.5 to 17 mm.

24. The device of claim 14, wherein the included angle of said annular cone is between about 15 to 165 degrees.

25. The device of claim 14, wherein said groove means are spiral grooves.

26. The device of claim 25, wherein the angle of said spiral grooves is between about 30 to 85 degrees.

27. The device of claim 25, wherein said spiral grooves are spaced at a distance between about 0.7 to 8 mm.

28. The device of claim 25, wherein the depth of said spiral grooves is between about 0.3 to 4 mm.

29. The device of claim 25, wherein the width of said spiral grooves is between about 0.4 to 5 mm.

* * * * *